United States Patent [19]

Eastcott

[11] Patent Number: 5,020,649

[45] Date of Patent: Jun. 4, 1991

[54] CLUTCH OR BRAKE INCHING ARRANGEMENT

[75] Inventor: Peter D. Eastcott, Peterborough, Canada

[73] Assignee: General Electric Canada Inc., Mississauga, Canada

[21] Appl. No.: 500,620

[22] Filed: Mar. 28, 1990

[30] Foreign Application Priority Data

Aug. 17, 1989 [CA] Canada .................................. 608650

[51] Int. Cl.⁵ .......................................... F16D 25/04
[52] U.S. Cl. .................. 192/48.1; 192/87.18; 192/88 B
[58] Field of Search ............ 192/48.1, 85 AT, 87.13, 192/87.18, 88 B

[56] References Cited

U.S. PATENT DOCUMENTS

| 2,193,481 | 3/1940 | Fawick | 192/88 B |
|---|---|---|---|
| 2,268,143 | 12/1941 | Schmitter et al. | 192/87.13 |
| 2,271,036 | 1/1942 | Schmitter et al. | 192/88 B |
| 2,277,554 | 3/1942 | McCoy | 192/88 B X |
| 2,304,030 | 12/1942 | Schmitter | 192/88 B X |
| 2,304,031 | 12/1942 | Schmitter | 192/88 B X |
| 2,304,032 | 12/1942 | Schmitter | 192/88 B X |
| 2,507,256 | 5/1950 | Keim | 192/88 B X |
| 3,777,868 | 12/1973 | Sugahara | 192/88 B |
| 3,958,681 | 5/1976 | Sugahara et al. | 192/88 B |
| 4,411,347 | 10/1983 | Bedar | 192/85 AT |

FOREIGN PATENT DOCUMENTS 934679 10/1973 Canada .
1056320 6/1979 Canada .

Primary Examiner—Rodney H. Bonck
Assistant Examiner—Nicholas Whitelaw

[57] ABSTRACT

A dual clutch for an inching arrangement in a load sharing drive which has two or more driving motors connected to a load through a dual clutch. The clutch has two (or more) clutch units mounted side by side on a driving shaft with an inflatable, flexible tube in each unit for pressing respective friction shoes outwardly, when inflated, against a surrounding cylindrical drum. The drum is mounted to a driven shaft. The driving shaft has a central bore connected through a solenoid operated valve to a supply of pressurized air when the valve is in an operating position and to an exhaust when the valve is in a dump position. Each of the tubes is connected to the central bore through a respective air line. A needle valve in one of the air lines provides a restriction to the flow of air into and out of the respective tube. The restriction is sufficient to substantially isolate the associated tube when the solenoid operated valve is operated to its dump position for a short time interval and then returned to its normal position. Thus, during a short pulse of reduced air pressure caused by the operation of the solenoid operated valve, the air flows largely out of only one tube thereby reducing the volume of air dumped to cause momentary slipping and improving the dynamic response of the clutch.

5 Claims, 2 Drawing Sheets

5,020,649

CLUTCH OR BRAKE INCHING ARRANGEMENT

BACKGROUND OF THE INVENTION

This invention relates to a drive system employing two or more torque transmitting devices, and particular it relates to an improved clutch or brake arrangement for providing load sharing between two or more motors driving a common load.

Canadian Pat. No. 934,679 issued Oct. 2, 1973 to Eastcott et al, describes a clutch or brake inching scheme. This scheme has been found to be practical and has enjoyed acceptance in the mining industry for synchronous motor driven grinding mill drives where load sharing or angle matching between partner driving motors is essential. If the load is not shared equally between the driving motors, one motor would be overloaded while the other motor would be underloaded.

The scheme described in the aforementioned Canadian Pat. No. 934,679 pulses the clutches for slightly different durations, that is, the clutch connected with the motor having the greater load is pulsed for a slightly longer time than is the clutch connected with the motor having the lesser load. The term "pulse" or "pulsing" refers to a brief reduction of the fluid pressure in a pressure actuated clutch so that the pressure in the clutch drops briefly below the load line permitting the clutch to slip. This unequal pulsing tends to cause the overloaded motor to shed some of its load while the underloaded motor takes on more load.

It should be remembered that the rotational adjustments are very small. For example, a 6000 HP, 180 RPM synchronous motor operated from a 60 Hz supply will have a 100% load change over a load angle, measured at the clutch, of 1.4 degrees. This is only 84 minutes of arc. If acceptable load sharing between motors was determined to be plus or minus 4%, then this is equivalent to only 3.36 minutes of arc (or 0.056 degrees). This is a very small angular amount.

One of the difficulties of achieving good load sharing is that the pulse of air (that is the reduced pressure pulse) does not immediately drop from a stable operating clutch air pressure to the desired reduced air pressure which permits clutch slipping, nor does it immediately return to normal operating pressure at the end of the pulse. The present invention seeks to improve the form of the pulse.

SUMMARY OF THE INVENTION

With the trend towards larger drives, it has become necessary to use with each driving motor two or more fluid clutches in parallel to transmit the larger motor torques. The present invention makes use of the two (or more) clutches which are in parallel in the drive chain.

Thus there is, for each driving motor, a clutch arrangement which has a clutch drum with two or more sets of clutch shoes which may be pressed outwardly against the drum. A shaft which extends within the drum carries an assembly for supporting each set of shoes and an inflatable tube for each set of shoes. When a tube is inflated by the injection of a fluid, such as, for example, air, the tube expands and presses the respective shoes against the clutch drum.

Each tube is connected by a respective fluid line to a bore extending axially within the shaft, and the bore is connected through a rotary connection and a flexible line to a solenoid operated valve. The valve can switch or change state so that it connects the line which goes to the rotary connection to either a supply of fluid under pressure or to an exhaust port. It is this valve that provides the pulse of reduced pressure for a short time interval to inch the clutch.

In operation the valve connects each tube through the rotary connection, supply lines, etc., to a source of fluid that is maintained at a predetermined operating pressure. When the valve is pulsed, it connects the tubes through the connecting lines, connections and hoses to atmosphere for a short time interval. This time interval, by way of example only, may typically be less than a second. The pressure in each tube falls equally as the fluid exhausts, but because of the volume of fluid which must exhaust and the resistance of the pathway through the lines, connections hoses and valve, the pressure in the tubes falls exponentially to a value beneath the load line pressure at which the clutch slips. When the short time interval is over, the valve reconnects the tubes to the source of fluid under pressure. Then the pressure in the tubes rises exponentially. The fall and subsequent rise of pressure in the tubes forms a downwardly extending curved and pointed locus which is relatively blunt. The present invention, by means of a simple improvement, makes the curve in the region of pressure change, considerably sharper. This improves the dynamic response of the clutch and makes the clutch easier to control.

The improvement is achieved by introducing a controlled restriction into only one of the two or more fluid lines which connect respective flexible tubes to the bore in the shaft. The restriction substantially isolates its respective tube from the remainder of the system insofar as the short interval pulse is concerned. This reduces the volume of fluid which must be exhausted in the short time interval to substantially one half (for a two tube clutch). Because the volume of fluid being dumped is reduced, the dynamic response of the system is improved.

It is therefore an object of the invention to improve the dynamic response of a clutch having two or more expandable tubes in an inched load sharing drive.

It is another object of the invention to provide a fluid operated clutch having two or more operating tubes for pressing shoes in the clutch against a drum, the clutch being for use in an inching arrangement in a load sharing drive, in which the clutch has an improved operating characteristic.

Accordingly there is provided a clutch for use in an inching arrangement in a load sharing drive system, comprising at least a first and a second clutch unit mounted on a driving shaft, each clutch unit having a respective first and second inflatable, flexible tube or actuating cylinder for pressing respective first and second friction shoes outwardly against a drum mounted to a driven shaft, the driving shaft having therein a central bore connected to a supply of fluid at a predetermined operating pressure, a first and a second air line each communicating with the bore and with a respective one of the first and second tubes, and a restriction in the second air line for restricting the flow of the fluid into and out of the second tube whereby the pressure of the fluid in the second tube falls only slightly in response to a pressure reduction in the bore which causes the pressure in the first tube for a short time interval to fall below a load line pressure permitting clutch slipping.

BRIEF DESCRIPTION OF THE DRAWINGS

The invention will be described with reference to the accompanying drawings, in which.

DETAILED DESCRIPTION OF THE PREFERRED EMBODIMENT

Figure 1:
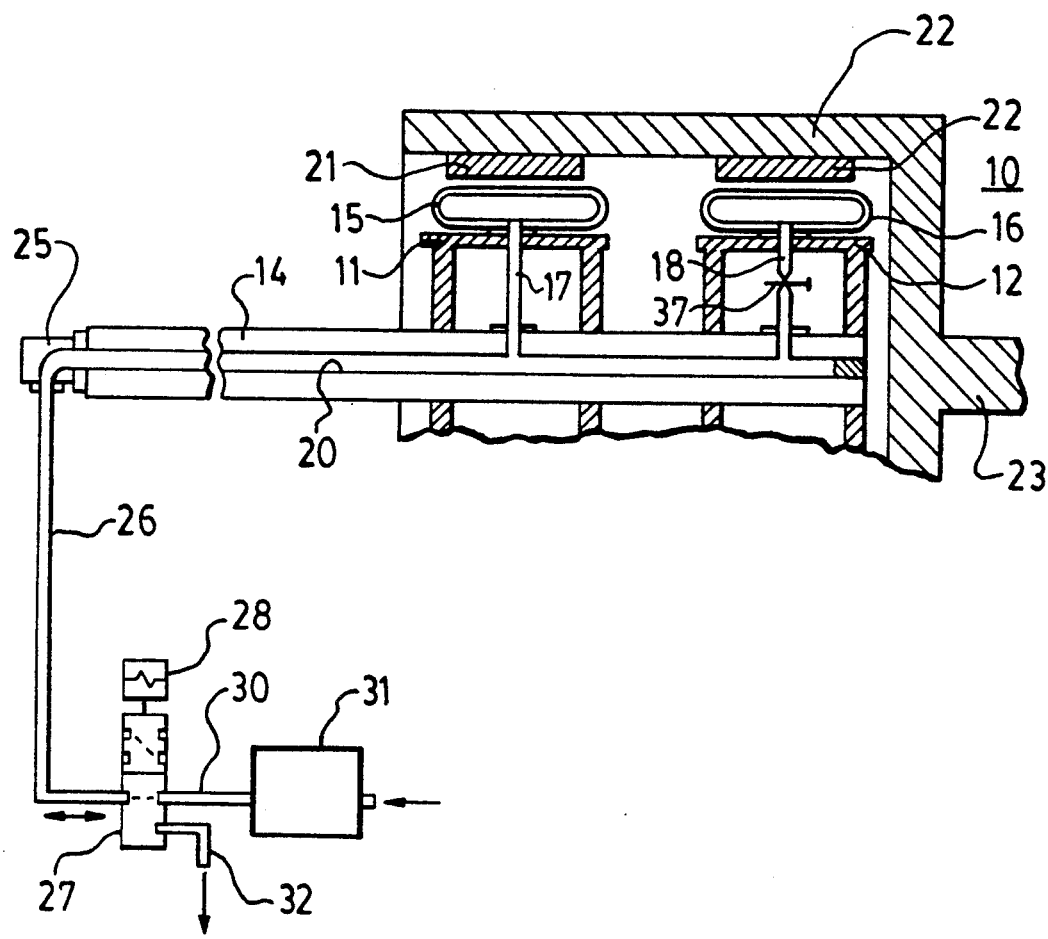
FIG. 1 is a schematic drawing showing part of a clutch, in section, with an associated fluid supply.

Referring first to FIG. 1, a clutch 10 is shown having two clutch units 11 and 12. The two clutch units 11 and 12 comprise a dual clutch assembly mounted on a driving shaft 14. Each clutch unit 11 and 12 has a respective heavy flexible, inflatable tube, such as a heavy rubber tube 15 and 16, mounted on it. Each tube 15 and 16 is connected by a respective air line 17 and 18 to central bore 20 in shaft 14. The following description will refer to air, air lines, supply of air under pressure, etc., however it should be noted that other suitable fluids may be used. Respective clutch friction shoes 21 and 22 are mounted radially outwards of tubes 15 and 16. The clutch friction shoes 21 and 22, the tubes 15 and 16, and the clutch units 11 and 12 are all constrained to rotate with shaft 14.

A drum 22 is mounted to a driven shaft or pinion shaft 23. The shafts 14 and 23 are coaxially arranged. In a grinding mill drive which has two driving motors, as described, for example, in the aforementioned Canadian Pat. No. 934,679 there would be two clutches, one for each driving motor. A shaft corresponding to shaft 14 in each clutch would be connected to a respective driving motor, and a shaft corresponding to shaft 23 in each clutch would be connected to a respective pinion. The multiple pinions would be in engagement with a common bull gear on the mill.

Still referring to FIG. 1, the bore 20 is connected through a rotary connection 25 and a flexible hose or line 26 to a valve 27. The valve 27 is connected through line 30 to a source 31 of air maintained at a stable operating pressure. The valve 27 has an exhaust 32 to atmosphere. The valve 27 is a fast acting valve that is operated by a solenoid 28 so that the hose 26 is connected either to line 30 and the source of air under pressure 31 or to exhaust 32.

The operation of the clutch system as described so far is well known. When a clutch 10 is to be inched, that is, when the pressure in tubes 15 and 16 is to be reduced for a short interval to permit the clutch to slip, solenoid 28 operates valve 27 so that hose 26 is connected for a short time interval to exhaust 32. This reduces the pressure in hose 26 and bore 20. Because, in the prior art, the air lines 17 and 18 are equally proportioned and unrestricted, the pressure in bore 20 is communicated equally to tubes 15 and 16. The pressure in tubes 15 and 16 drops equally to a pressure below the load line pressure at which the clutch begins to slip. The solenoid 28 then operates valve 27 to its normal operating position and hose 26 is connected through line 30 to source of air under pressure 31.

Figure 2A:
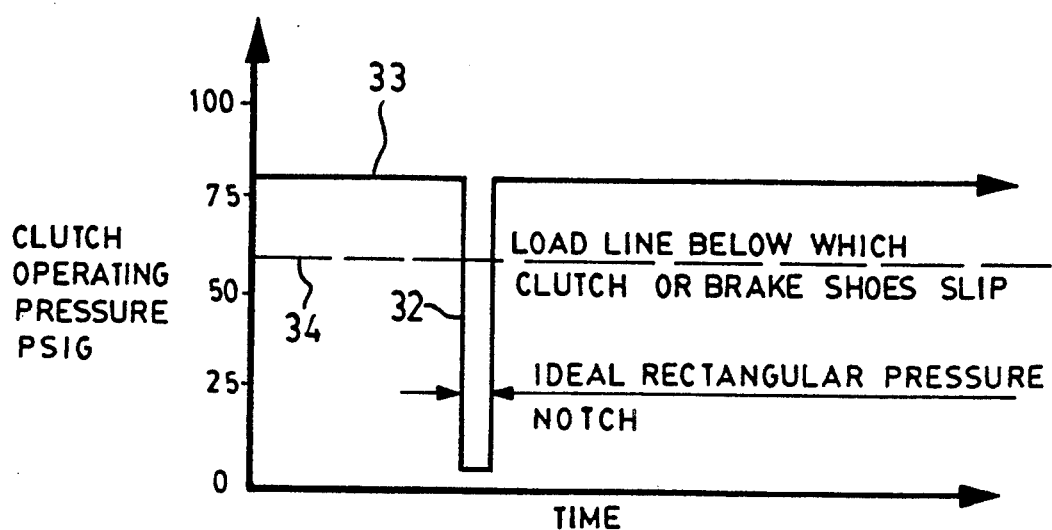
FIGS. 2A and 2B are graphs of clutch pressure plotted against time for an ideal pulse of reduced pressure and for a typical practical pulse of reduced pressure in a prior art clutch, useful in describing the invention.

Referring now to FIG. 2A, there is shown a graph of air pressure in a clutch plotted against time and this represents an ideal pressure notch 32, that is, it represents an idealized pressure reduction pulse 32. The line 33 represents the normal, stabilized, clutch operating pressure. The broken line 34 represents the clutch load line, that is, it represents a pressure below which the clutch will slip. It will be seen that the idealized pressure notch 32 drops rapidly from the clutch operating pressure 33 to a level well below the load line 34, levels off for a short time interval, and then rises rapidly to the normal clutch operating pressure 33. The time duration of such a pressure reduction notch 32 might, ideally, be of the order of microseconds. While such a pressure reduction notch cannot be achieved, the closer a clutch can approach this notch the better will be the clutch response.

Figure 2B:
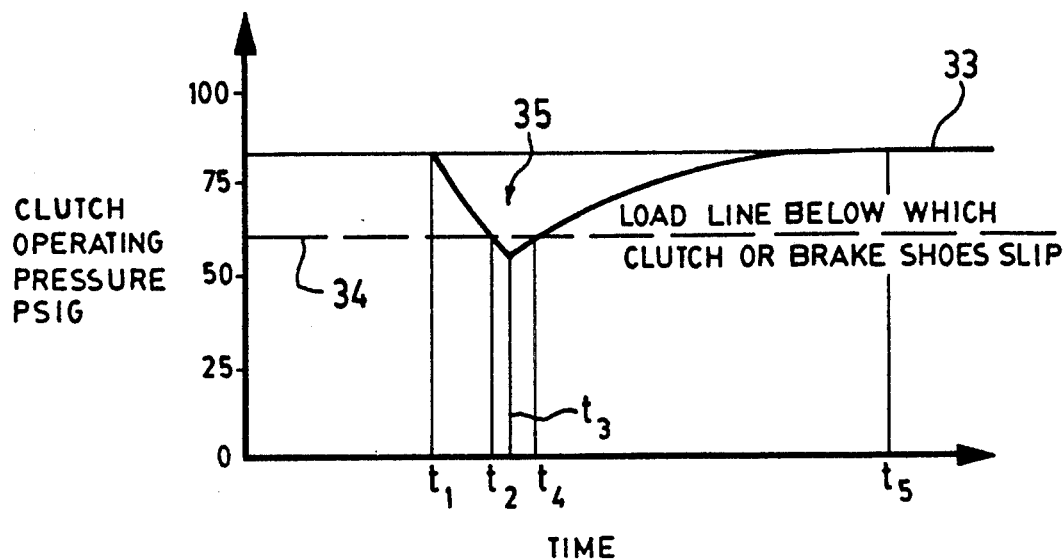

Referring now to FIG. 2B, there is shown another graph of clutch pressure plotted against time, and this graph represents a typical pressure reduction notch such as prior art clutches might provide. Again, line 33 represents normal clutch operating pressure and broken line 34 represents the clutch load line. At time $t_1$ valve (such as valve 27, FIG. 1) dumps to atmosphere and the pressure in the clutch (such as tubes 15 and 16, FIG. 1) begins to reduce exponentially towards atmospheric pressure. At time $t_2$ the pressure in the clutch falls past the clutch load line and the clutch begins to slip. At time $t_3$ the valve recloses and the valve connects the clutch system (such as hose 26, etc.) to a source of air under pressure (such as source 31, FIG. 1). The pressure in the clutch (such as tubes 15 and 16, FIG. 1) begins to build up exponentially. At time $t_4$ the pressure in the clutch increases past the load line and the clutch stops slipping. At time $t_5$ the clutch pressure is restored to normal operating pressure. Thus the pressure in the clutch (tubes 15 and 16) is below normal operating pressure from time $t_1$ to time $t_5$, and the clutch slips only between time $t_2$ and time $t_4$. The pressure notch 35 is relatively blunt. The closer the pressure notch can be made to approach the ideal notch (i.e. the sharper the notch can be made), the better will be the response of the clutch.

Referring again to FIG. 1, according to the invention, an adjustable or settable restriction is introduced into air line 18. This restriction is preferably a needle valve 37. The needle valve 37 provides a restriction which reduces the rate of flow of air into and out of tube 16. During normal operation both tubes 15 and 16 will have air at normal clutch operating pressure and will transmit equal torque to drum 22. However, during sudden changes of pressure in bore 20, the needle valve 37 restricts the flow of air into and out of tube 16. Thus, needle valve 37 substantially isolates tube 16 from the very rapid pressure reduction pulses which are used in a load sharing arrangement such as is described in the aforementioned Canadian Pat. No. 934,679. The pressure reduction pulses which are created in bore 20 of shaft 14 are typically less than one second in duration. The volume of air in tube 16 which communicates with bore 20 through needle valve 37 may be made to represent a value equivalent to perhaps a five second time constant. Needle valve 37 thus effectively uncouples clutch unit 12 from responding to fast pressure pulses, but clutch unit 11 which has no similar restriction will be able to respond.

During a fast pressure reduction pulse or notch, the volume of air which must be handled by valve 27 is only slightly greater than that volume concerned with tube 15 since tube 16 is substantially isolated for rapid pressure changes. Because the volume of air that must be dumped to atmosphere and replaced must pass through the flow restricting resistances of air line 17, bore 20, rotary connection 25, hose 26 and valve 27 is considerably reduced, the dynamic response will be improved. With the needle valve 37 in use during a rapid pressure reduction pulse, the clutch unit 11 will provide a greater proportion of the inching or synchronizing function and the clutch unit 12 a very minor portion. The load angle displacement between two driving synchronous motors can be made very small although each clutch may slip a significant amount during a pulse cycle.

Those skilled in the art will appreciate that if a compressible fluid such as air is used to control the clutches from an external valve array, it is impossible to create the ideal narrow vertical sided pressure notch shown in FIG. 2A. In practice the best that can be done, because of fluid compressibility and pipe friction losses, is to create a pressure notch that consists of an exponential decay curve during dumping the clutch tube pressure to atmosphere, followed by an exponential pressure recovery curve when the control valve recloses to stop further movement of the clutch shoes and cause the clutch tube pressure to return to normal operating pressure. This is shown generally in FIG. 2B. Aforementioned Canadian Pat. No. 934,679 teaches that the clutch operation can be improved if the controlling valve open-close pulse cycle is just long enough to cause the pressure in the clutches to fall for only several milliseconds below that precise load line pressure needed to prevent shoe slippage. The shape of the pressure decay and recovery curves above the shoes locked pressure is then irrelevant. Pat. No. 934679 also teaches that with principle of differential pulsing, the net clutch shoe movement effecting the load angle displacement between two partner synchronous motors can be made very small although each clutch may slip a significant amount during a pulse cycle.

The precision of control possible with these systems, if air is used as the controlling medium is restricted by the total volume of each clutch being pulsed. It is only practical to increase the size and dynamic fluid handling capacity of the air valves, piping, rotary connection to the motor shaft, and motor shaft bore up to a certain point. As the clutch tube volumes become larger in size, those skilled in the art will readily appreciate that the pressure notches as seen by the clutch shoes increase in width, or get further away from the ideal narrow vertical sided notch configuration which would produce excellent control.

In accordance with the invention the dynamic response of the inching controls is improved by placing a small restriction in the air connection to one of the two or more clutch tubes connected in parallel. If the size of the restriction is chosen so that the ability of the tube which is fed through them takes perhaps ten times as long to follow pressure fluctuations as its partner clutch element tube without restrictions, then dynamically for very short time pressure notches, the total clutch volume to be pulsed appears to the control system as if it were reduced to almost half. With this improvement alone the pressure notches in the unrestricted tube tend towards half the full volume clutch width duration which permits better control of the inching process. Between the slow engagement of grinding mill clutches during the acceleration period which may occur over 10 seconds compared to perhaps a 0.5 second full pulsing notch there is excellent discrimination possible by selecting the correct setting of needle valve 37, FIG. 1.

The improvement obtained in the dynamic response of such systems by the introduction of suitable restrictions 37 would at first appear to approach 2:1, but this is not the case. In a two element or dual clutch assembly when one of the tubes is isolated by restrictions from sudden control pressure changes, it must be appreciated that its clutch shoes do not respond to the pressure notch and tend to remain at the original torque level. Those versed in regulating system mathematics will recognize that the restrictions have reduced the mechanical gain of the system to some number approaching one half of its unrestricted value. The magnitude of the pressure changes in the unrestricted clutch to produce slip will then tend to increase to twice their original value, and it would first appear that adding restrictions is a trade off.

Several factors tend to favour the system using a restriction in one or more (but not all) of the clutch air lines. When any fluid is moved rapidly through pipes and fittings, the friction effect degrading pulse width is a function of velocity, particularly in the case of a compressible fluid such as air. In the case of any system using air to control the clutches, it is well known that when the flow rate tries to exceed the speed of sound, it is almost impossible to induce the air to move any faster regardless of the pressure applied. By cutting down the amount of air to be handled during each synchronizing pulse, these non linear resistances to flow become less able to degenerate or widen out the pressure notches as seen by the clutch tubes. Consequently there can be a net gain in performance approaching 30 percent depending entirely on the physical configuration of the valves, piping, and pressure supply.

Figure 3:
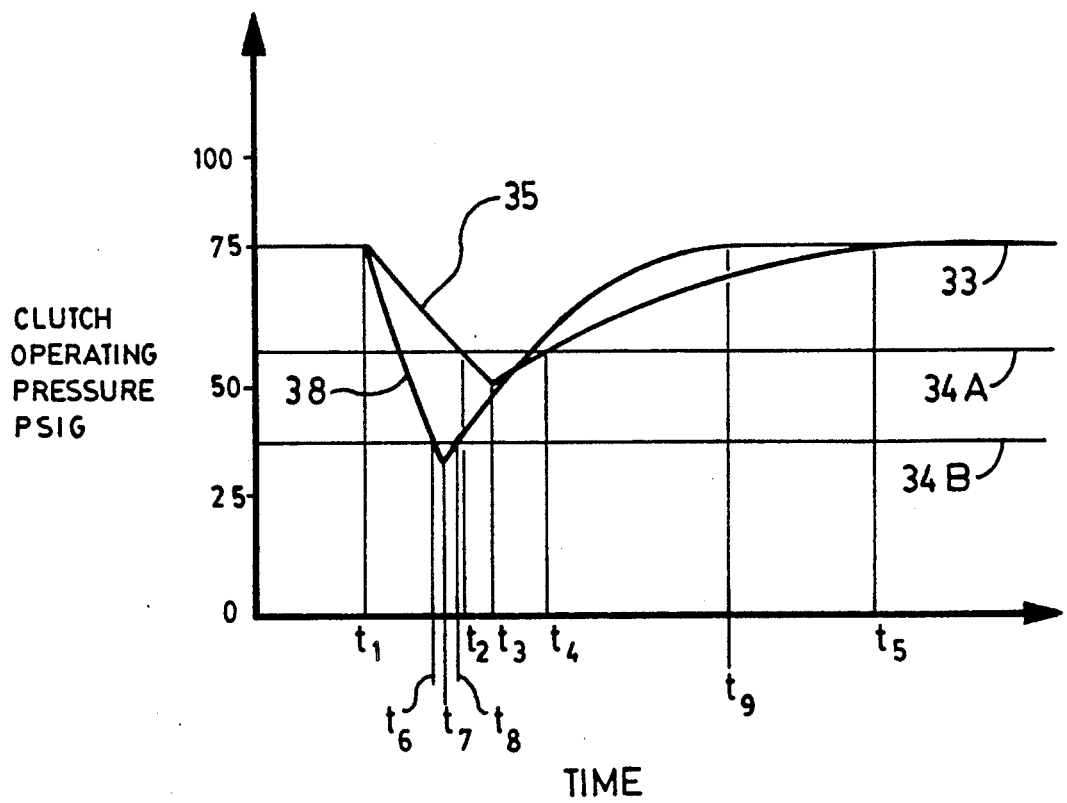
FIG. 3 is a graph of clutch pressure plotted against time, showing a comparison between a reduced pressure pulse for a prior art clutch and a clutch according to the invention.

Referring to FIG. 3, there is shown a graph of clutch pressure plotted against time for a prior art type of clutch and for a clutch according to the invention with a restriction in one of the air lines. The notch or curve 35, representing a short interval pressure reduction in a prior art type of clutch is the same as that depicted in FIG. 2B. Line 33 represents the normal clutch operating pressure, and line 34A represents the clutch load line where a prior art type of clutch begins to slip.

The time $t_1$ is the time at which a valve opens to dump the air in the system to atmosphere. With respect to the notch 35, the time $t_2$ is the time at which the air has bled off exponentially from both clutch units sufficiently for the clutch to begin to slip. Time $t_3$ is the time at which the valve recloses. Time $t_4$ is the time at which the pressure has risen exponentially past the clutch load line 34A. Finally time $t_5$ is the time at which the pressure is restored to normal clutch operating pressure.

In the arrangement according to the invention, the line 33 again represents the normal clutch operating pressure. Line 34B represents the clutch load line. Note that the clutch load line 34B is below the load line 34A. This is because, when the valve opens, the pressure in only one tube falls significantly (the tube without the restriction), and the pressure must drop to a lower level before the clutch will slip. The curve or pressure notch 38 represents the pressure in an inching cycle with the present invention. At time $t_1$ the valve 27 (FIG. 1) opens to dump the air in the system to atmosphere. Time $t_6$ represents the time at which the pressure has bled off sufficiently for the clutch to slip. Time $t_7$ is the time at which valve 27 (FIG. 1) recloses to restore operating pressure to the system. Time $t_8$ is the time at which the clutch pressure has risen (exponentially) to the clutch load line 34B and the clutch ceases to slip. Time $t_9$ is the time at which clutch pressure is restored to the normal clutch operating pressure represented by line 33.

It is of interest that clutch manufacturers are able to provide clutch linings with a dynamic coefficient of friction that is substantially the same as the static coefficient of friction. For this reason the graphs do not show any distinction. However, it will be apparent that the improvement achieved by this invention is not dependent upon this.

It will be noted that in FIG. 3, the pressure notch curve 35 has a relatively blunt tip where it penetrates the load line 34A for the short time interval $t_2$ to $t_4$. In the present invention, with the needle valve 37 (FIG. 1) set appropriately to restrict the flow into and out of tube 16 (FIG. 1), the pressure notch curve 38 has a narrower and sharper tip where it penetrates the clutch load line 34B. The notch 38 may thus be said to approach more closely the ideal notch 32 of FIG. 2A. With the trend towards larger motors and clutches, this improvement can be commercially significant.

It is believed the preceding description has provided a clear understanding of the invention.

What I claim as new and desire to secure by Letters Patent of the United States is:

1. In a clutch for use in an inching arrangement in a load sharing drive system comprising at least a first and a second clutch unit mounted on a driving shaft, each clutch unit having a respective first and second inflatable, flexible tube for pressing respective first and second friction shoes outwardly against a drum mounted on a driven shaft, said driving shaft having therein a central bore connected to a supply of fluid under pressure, a first and a second air line each communicating with said bore and with a respective one of said first and second tubes, and a restriction in said second air line for restricting the flow of said fluid into and out of said second tube, whereby the pressure in said second tube falls only slightly in response to a pressure reduction in said bore for a short time interval, said pressure reduction for said short time interval causing the pressure in said first tube to fall sufficiently to permit the clutch to slip.

2. The invention as defined in claim 1 in which said short time interval is of the order of a second or less.

3. The invention as defined in claim 1 in which said restriction is an adjustable needle valve.

4. A clutch for an inching arrangement in a load sharing drive system, comprising
   at least a first and a second clutch unit mounted on a driving shaft for rotation therewith, each clutch unit having a respective first and second inflatable, flexible tube and respective first and second friction shoes mounted outwardly of said first and second tubes,
   a drum mounted to a driven shaft, said driven shaft and said driving shaft being coaxially arranged, said drum being positioned outwardly of and adjacent said friction shoes whereby inflation of said first and second tubes presses said first and second friction shoes against said drum,
   said driving shaft having a central bore,
   means connecting said central bore through a solenoid operated valve to a supply of air at a predetermined operating pressure when said valve is in a first position and to an exhaust when said valve is in a second position,
   a first and a second air line each communicating with said central bore and with a respective one of said first and second tubes, and
   a needle valve in said second air line for restricting the flow of air into and out of said second tube when said solenoid operated valve is operated from said first position to said second position for a short time interval and then operated back to said first position, the operation of said solenoid operated valve causing a reduction in pressure in said first tube sufficient to cause the clutch to slip while substantially maintaining pressure in said second tube.

5. A clutch as defined in claim 4 in which said short time interval is of the order of a second or less.

* * * * *